Aug. 26, 1930. G. E. MEISSNER 1,774,207
INSULATED HANDLE
Filed April 29, 1929
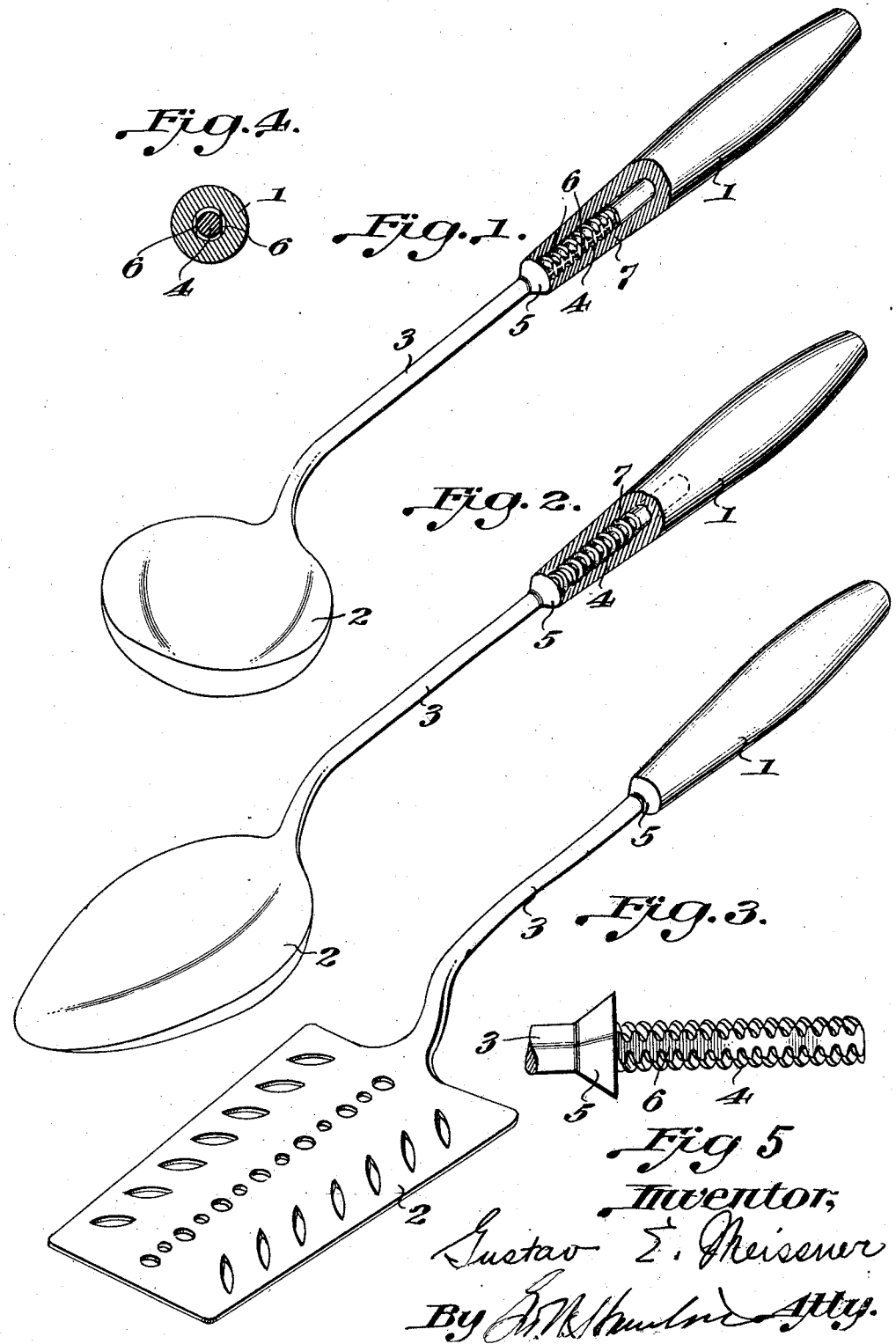

Patented Aug. 26, 1930

1,774,207

UNITED STATES PATENT OFFICE

GUSTAV E. MEISSNER, OF NEW YORK, N. Y.

INSULATED HANDLE

Application filed April 29, 1929. Serial No. 359,136.

This invention relates to an improved handle for aluminum ladles, spoons, slotted spoons, cake turners, and other similar aluminum culinary utensils.

Prior to my invention, cast aluminum ladles, spoons, slotted spoons, cake turners, and other similar culinary utensils have been in common use, but as the handles of these articles have usually been of aluminum, there has resulted much discomfort to the user when handling hot liquids and solids, as the heat to which the aluminum ladles, spoons, slotted spoons, cake turners, and other similar culinary utensils is subject, is rapidly communicated to the handle.

The object of my invention is to provide an improved "cold" handle for utensils of this character, which will prevent conduction of the heat to the hand of the user, and yet be so disposed that it will be located considerably away from the bowl or holding part of the utensil, and thus the hand of the user will not be positioned where it would be subject to heat radiated from the bowl, nor disposed over the container in which the heated material or liquid is located.

Another object is the provision of an improved, handled culinary utensil having an aluminum stem, provided with a novel tang and shoulder or collar, combined with an attachable and detachable handle of heat-insulating material, which may be readily attached to the tang so as to form a permanent part of the handle of the utensil, while being adapted for detachment should it become necessary to substitute another heat-insulating handle.

In carrying out the invention, the bowl or holding part of the utensil, and the stem or shank are preferably integral and, as usual, they are of aluminum. The stem or shank is of such length that if it comes in contact with the container or vessel whose contents are being handled, the cold handle will still be disposed out of the way; on the other hand, the stem or shank should be of such length that the utensil may be conveniently manipulated without the hand of the user being near such vessel. The tang of the stem is provided with external, coarse, screw threads, and the handle has an internally screw threaded socket to engage said screw threads. This stem has a collar or shoulder against which the end of the handle abuts when the handle is screwed up tight. Thus, the handle is securely attached and yet it may be unscrewed if it is necessary to remove it for the purpose of substituting another handle.

Any suitable heat insulating-material may be used for the handle. I have found that wood, papier-mâché, vulcanized fiber, and similar materials are well adapted for the purpose.

To facilitate screwing on the handle, the screw threaded tang is provided with one or more flattened sides to allow the air to escape as the handle is screwed up until it abuts the shoulder or collar on the stem.

In the accompanying drawings I have illustrated only certain handled culinary utensils of aluminum to which my invention is applicable, but it is to be understood that there is a wide range of such articles to which this invention may be applied.

In the drawings:

Figure 1 is a perspective view of a ladle provided with my invention, parts of the handle being broken away to disclose the screw tang.

Fig. 2 is a similar view showing the invention applied to a spoon.

Fig. 3 is a perspective view showing the invention applied to a cake turner.

Fig. 4 is a cross section through the handle and the screw tang.

Fig. 5 is an enlarged, detail view of the tang and collar.

The common practice heretofore, has been to form the bowl, stem, and handle part of the utensil out of aluminum, in an integral piece, such articles being commonly cast. Being of aluminum, the stem and handle soon become uncomfortably hot when a hot liquid or solid is being handled by the utensil, and the heat is often such that it is inadvisable to grasp the handle with the naked hand.

My invention overcomes this trouble by the provision of a handle 1 of heat-insulating material. This handle may be of wood, papier-mâché, vulcanized fiber, or other heat-insulating material or composition.

The bowl 2, or other device for handling the liquid or solid material, is formed integral with an elongated stem 3. On the end part of the stem there is provided a tang 4 having coarse external screw threads extending from the extremity of the tang inwardly to the region of a shoulder or collar 5 formed as an integral part of the stem 3.

The screw threaded tang 4 is preferably provided with one or more flat sides 6 so that when the handle 1 is screwed on, the air cushion in the screw threaded socket 7 of the handle will be relieved, thus enabling the handle to be readily screwed up tight against the shoulder 5, which is permitted by reason of the socket 7 being longer than the tang 4.

The handle 1, being of non-heat conducting material, remains cool when hot solids and liquids are handled by the utensil. If the handle becomes worn or broken, it can be readily unscrewed and another substituted therefor, without necessitating loss of the entire utensil.

An advantage found in my invention, is that by providing a considerable length of aluminum metal stem 3, all of the advantages of an all aluminum metal stem and handle, such as previously used, are obtained, without any of the disadvantages thereof. For instance, the stem 3 is relatively long so that it will be adapted to rest against the edge of the vessel whose contents are being handled, if desired, and the handle 1 is disposed so far away from the bowl 2 that the hand of the user cannot come in contact with the vessel nor will it be located above the vessel and subject to steam and heat. Again, the handle 1 has the advantage of such size and shape as to be conveniently grasped by the user, whereas the usual flat integral aluminum metal handles heretofore used, are not so shaped that they can be properly gripped.

Figure 1 illustrates the invention in connection with an aluminum ladle, dipper, or bowl-shaped utensil; Fig. 2 shows it in connection with a spoon; Fig. 3 in connection with a cake turner, but it is obvious that my improvements may be used with slotted spoons, other ladles, and other similar aluminum utensils.

This application is for the subject matter of my application Serial No. 723,805 filed July 2, 1924.

I claim:

In a culinary utensil having a material-handling part and an elongated stem, both of aluminum, said stem being provided with an external screw threaded tang at its end and with a collar or shoulder, the screw threaded tang having a flattened side, to allow the air to escape, a handle of non-heat conducting material having an internally screw threaded socket receiving and engaging the screw threaded tang, said handle constituting a continuation of the stem and having its inner end abutting said collar or shoulder.

In testimony whereof I affix my signature.

GUSTAV E. MEISSNER.